Sept. 20, 1938. A. R. ALLARD 2,130,478
MACHINE FOR BLADING TURBINE ELEMENTS
Filed Jan. 21, 1937 3 Sheets-Sheet 2
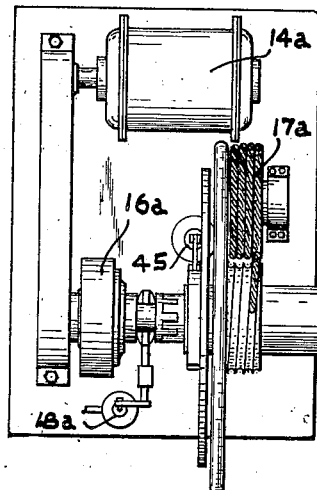
FIG. 3.
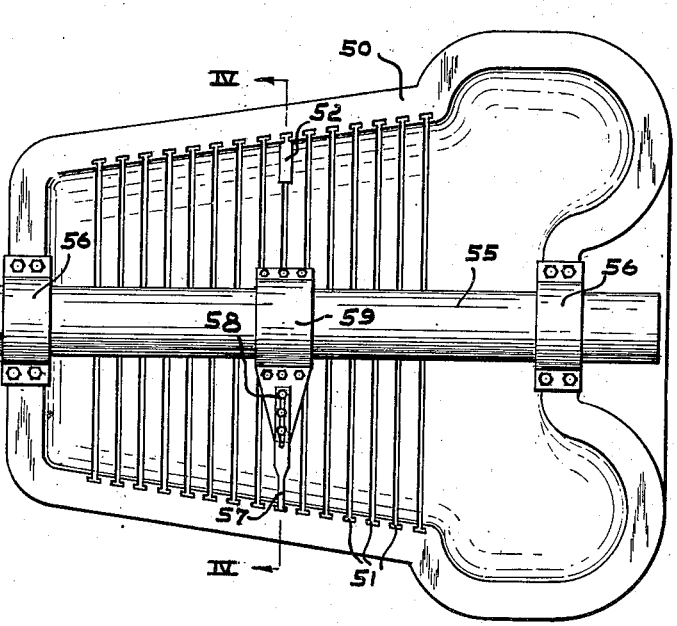
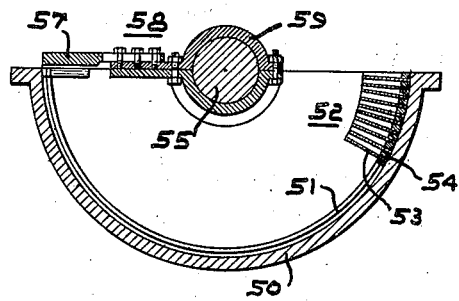
FIG. 4.
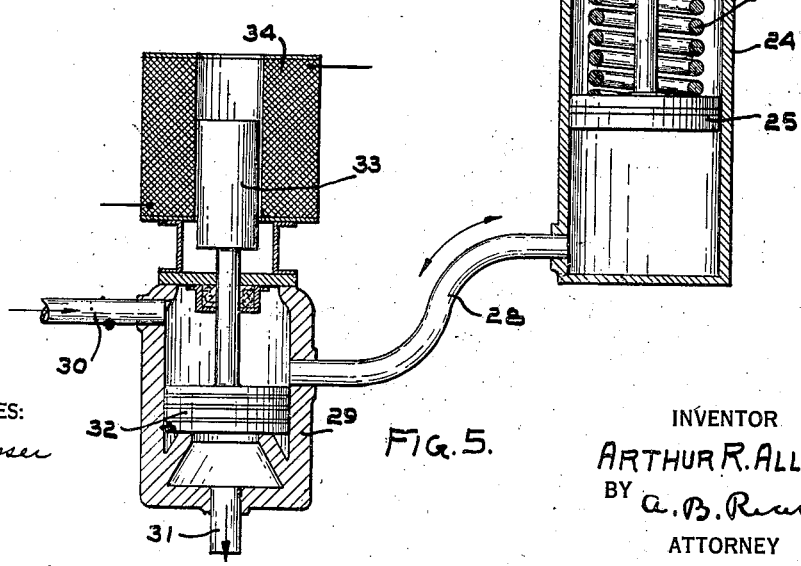
FIG. 5.
WITNESSES:
James K. Mosser
E. Lutz
INVENTOR
ARTHUR R. ALLARD.
BY a. B. Rivers
ATTORNEY

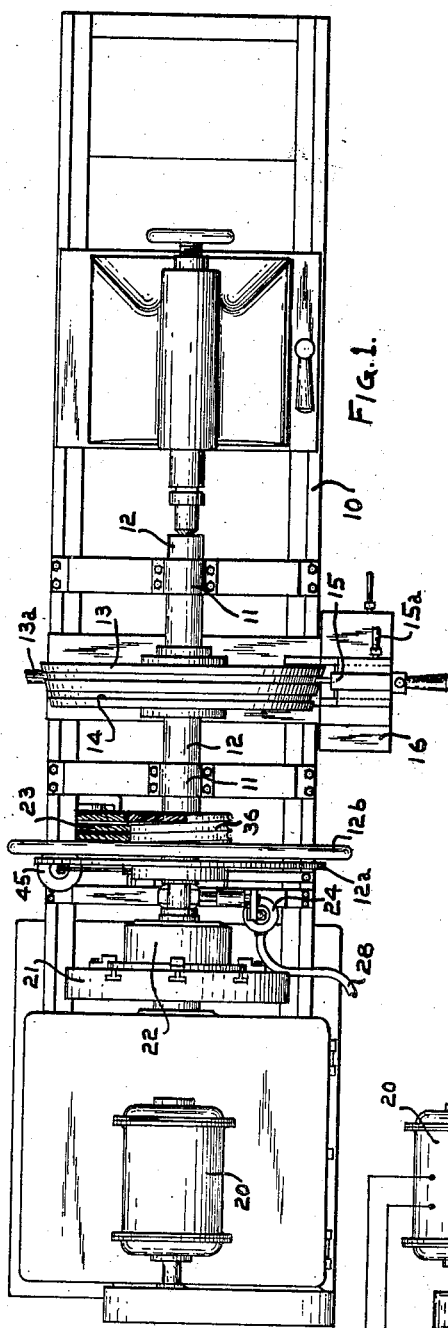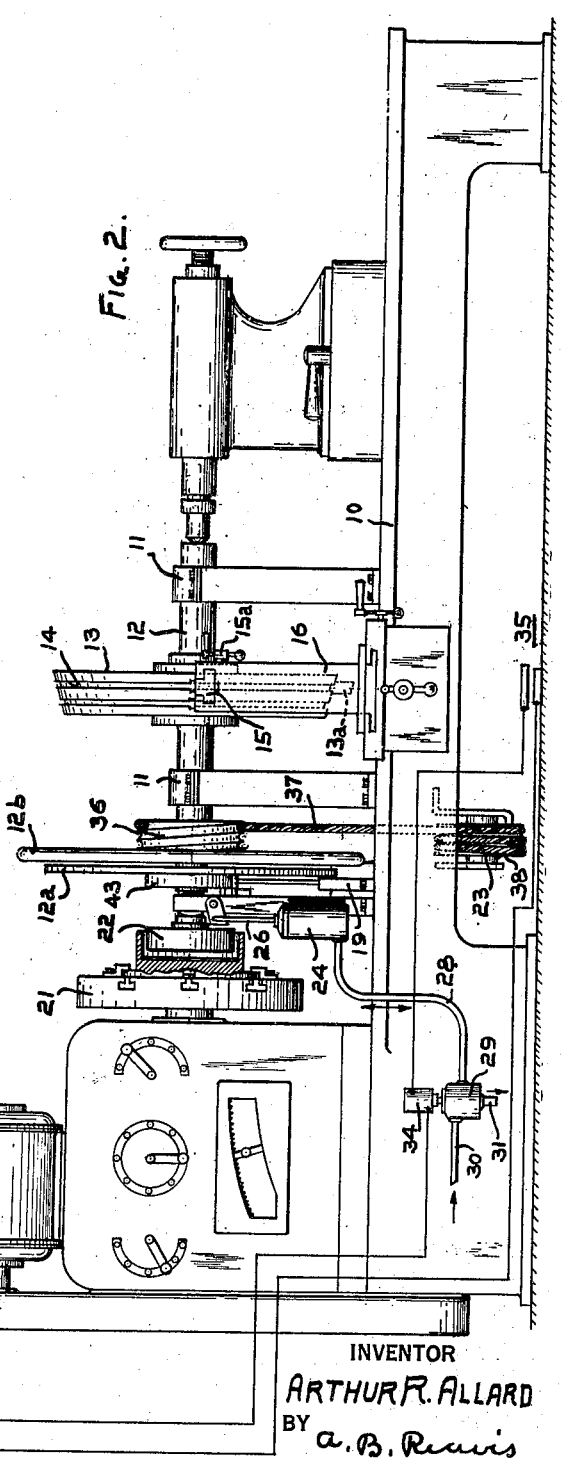

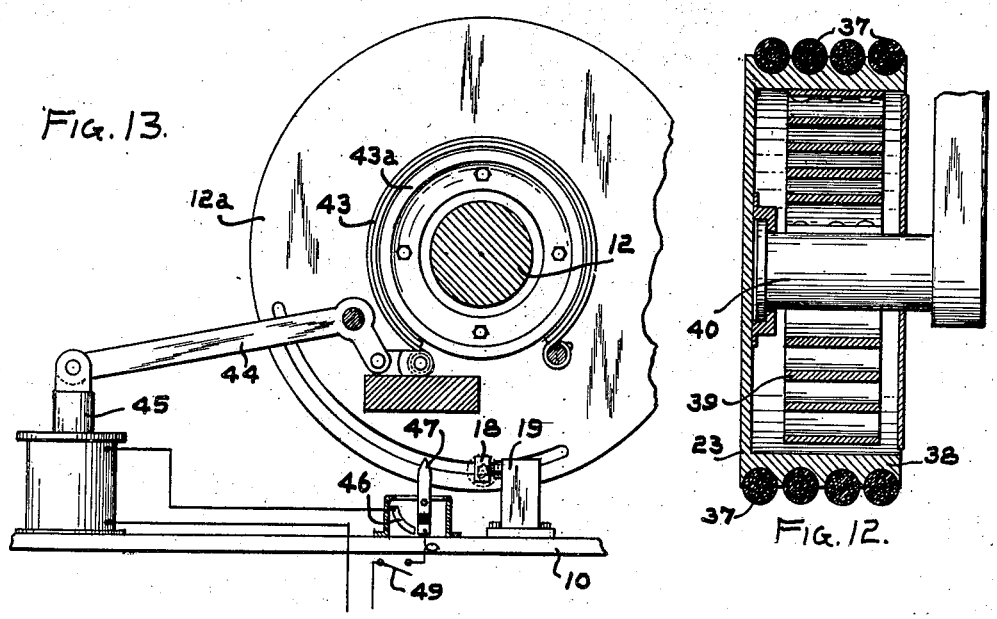
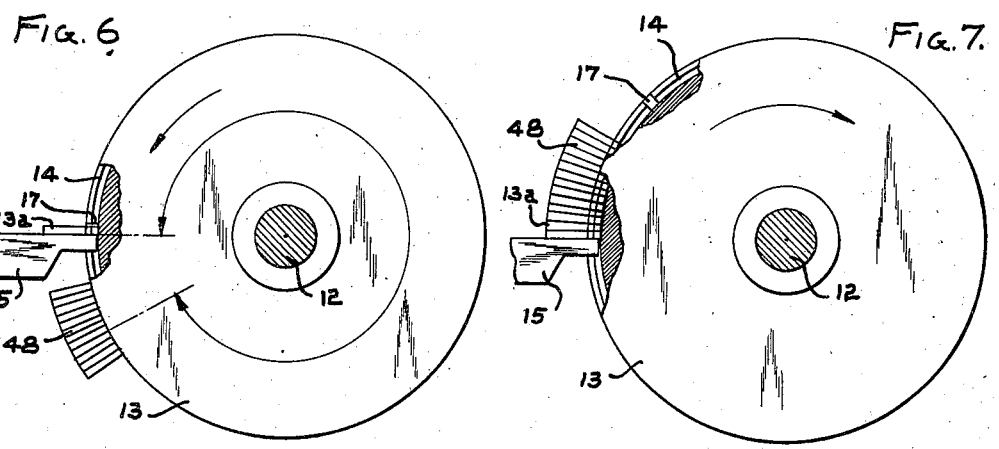
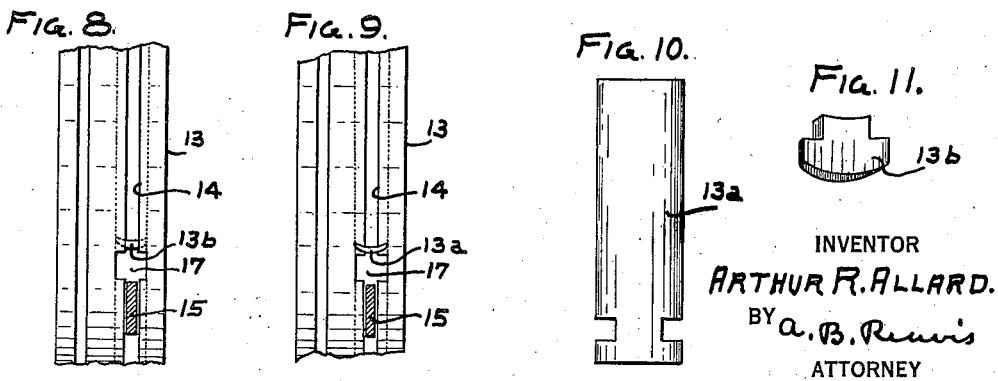
INVENTOR
ARTHUR R. ALLARD.
BY a. B. Reuis
ATTORNEY Patented Sept. 20, 1938

2,130,478

UNITED STATES PATENT OFFICE 2,130,478

MACHINE FOR BLADING TURBINE ELEMENTS

Arthur R. Allard, Drexel Hill, Pa., assignor to Westinghouse Electric & Manufacturing Company, East Pittsburgh, Pa., a corporation of Pennsylvania Application January 21, 1937, Serial No. 121,381

15 Claims. (Cl. 29—23.5)

My invention relates to a machine for blading turbine elements and it has for an object to provide apparatus of this character wherein blading elements are packed or placed due to impact of a blading element with a previously assembled blading element and brought about by relative forward motion, from a starting position, of the turbine element with respect to an anvil element, the turbine and anvil elements having relative motion in the other direction to return them to starting position.

A further object of my invention is to provide a machine for blading a turbine element and which has a continuously operating driving motor whose energy is utilized to secure relative motion of turbine and anvil elements in forward and return directions, whereby the full torque of the motor is effective to secure rapid acceleration of the forward motion and adequate impact for packing blading elements in place.

A further object of my invention is to provide a machine for blading a turbine element having an undercut groove within which extends an anvil element, these parts normally occupying relatively a starting position at which the blading elements may be inserted into a suitable entrance of the groove, together with a motor and mechanism for deriving energy from the motor for bringing about relative motion of the turbine element and the anvil in forward and return directions, the motion in the forward direction moving a blading element along the groove from the entrance to engage a previously assembled blading element, whereupon energy of the moving element is absorbed in packing the blading element in place and then, due to energy absorbed by the mechanism during forward motion, the moving element is returned to starting position.

A further object of my invention is to provide a turbine blading machine having a driving motor together with mechanism for securing relative forward and return motion of parts to effect traversal and packing of blading elements together with means for retarding the return motion as starting position is approached.

These and other objects are effected by my invention as will be apparent from the following description and claims taken in connection with the accompanying drawings forming a part of this application, in which:

Fig. 1 is a plan view of my improved apparatus;

Fig. 2 is a side elevational view of the apparatus shown in Fig. 1;

Fig. 3 is a plan view of an alternative arrangement wherein the anvil member is given forward and return motion;

Fig. 4 is a sectional view taken along the line IV—IV of Fig. 3;

Fig. 5 is a detail sectional view of the groove operating mechanism;

Figs. 6 and 7 are diagrammatic views pertinent to the first embodiment and showing the rotor in different positions;

Figs. 8, 9, 10, and 11 are detail views showing an undercut groove and blading elements;

Fig. 12 is a transverse sectional view of the energy storage device; and

Fig. 13 is a transverse sectional view showing the braking mechanism.

Referring now to the drawings more in detail, in Fig. 1 there is shown a machine provided with a stationary supporting structure or frame including a bedplate 10 having supporting bearings 11 for the arbor 12 arranged to have a turbine element 13 mounted thereon. The turbine element has an undercut groove or grooves 14 therein, within which is arranged to extend the anvil 15 carried by the pedestal 16 mounted on the bedplate 10, the anvil being arranged to be fed into and retracted from the undercut groove 14 by suitable feed means 15a.

Each groove has a recess 17 (see Figs. 8 and 9), or open end, for the insertion of blading elements, the term "blading element" being used herein to designate both the blades 13a and the packing pieces 13b which are inserted between adjacent blades to provide proper spacing thereof. Normally, as shown in Fig. 6, the rotor element occupies such a position relatively to the anvil that the entrance recess is accessible for insertion of blading elements. After a blading element is inserted, the turbine rotor is moved in a direction to cause the anvil member to push the blading element along the groove until the latter is brought into engagement with a previously assembled blading element (Fig. 7), whereupon the energy stored in the arbor and the rotor is effective to secure firm packing of the blading element in place. After forward motion of the rotor and the arbor and packing of the blading element, the arbor is given return motion to bring the rotor back to starting position, the latter being determined by cooperating abutments 18 and 19 carried by the arbor at 12a and the support 10, respectively. The arbor 12 also has a hand wheel 12b which can be used for manually packing the initial group of turbine elements.

The machine frame 10 also has mounted thereon a motor 20, which normally operates continuously in one direction to effect blading operations.

The motor 20 turns the driving element 21 continuously in one direction, the driving element being alined with the arbor 12. A frictional clutch 22 is provided for connecting and disconnecting the arbor and the driving member.

The clutch 22 is arranged to be connected to effect movement of the blading element along a blade groove and packing thereof in place, whereupon the clutch is disconnected and the energy storage device 23 then becomes effective to return the arbor to starting position.

The clutch 22 is preferably of the ordinary frictional type and its operation is controlled by means, for example, the operating cylinder 24 having a piston 25 (see Fig. 5) therein connected to a rod 26, which is used to actuate the clutch. A spring 27 is held against the upper side of the piston 25, compressed air being admitted to the cylinder below the piston by means of the supply line 28 connected to the valve housing 29, the latter having connected thereto the high pressure air line 30 and the exhaust line 31. A valve 32 is arranged in the housing and it is operative to establish communication between the supply line 28 and the high pressure line 30 to admit air under high pressure below the piston 25 to raise the latter against the force of the spring 27 and to establish communication of the line 28 with the exhaust 31, whereupon air in the cylinder below the piston 25 is exhausted and the piston moves downwardly due to the force of the spring 27.

Upward movement of the valve 32 to connect the line 28 with the exhaust 31 is effected by means of the core 33 of the solenoid, at 34, the latter being energized by closure of the switch, at 35 (see Fig. 2). Therefore, to connect the clutch and to drive the turbine element in a forward direction, the operator closes the switch, at 35, thereby energizing the solenoid, at 34, connecting the cylinder 24 to the exhaust, and permitting the spring 27 to connect the clutch 22.

Assuming that the arbor and the rotor carried thereby are in starting position and that the clutch is connected, then the motor 20, operating at normal speed, is effective to secure rapid acceleration of the arbor and of the rotor; and not only is the acceleration rapid but the full torque of the motor is applied. The energy of the moving turbine element is utilized for packing a blading element in place. When the blading element being inserted strikes the preceding blading element, the clutch slips and is then immediately released. If desired, only the packing pieces may be packed with full force, the blades being merely moved into position against the preceding packing pieces without great impact, which may be accomplished by releasing the clutch as the blade approaches the previously mounted packing piece.

After the step of packing or positioning, the turbine element is moved in the return direction to starting position, the return movement being effected by means of the energy storage device 23, which derives energy from the motor 20 during forward motion of the arbor and of the rotor element.

As shown, the arbor 12 carries a drum 36 around which is wrapped the cable 37, and, as shown in Fig. 12, the lower end of the cable being wrapped about the drum 38 of the energy storage device, the drum 38 containing a spiral spring 39 whose outer end is connected to the interior of the drum and whose inner end is connected to a support 40. During forward motion of the arbor and of the rotor, the spring 39 is loaded more and more; and, just as soon as the clutch 22 is released, energy of the spring is available to effect return motion of the arbor and of the rotor.

As the arbor and the rotor return to starting position, the rotor motion should be retarded to minimize shock and any tendency to rebound of the moving part. Accordingly, the rotor 13 is held in starting position by means of the energy storage device and the arbor has associated therewith a brake 43 which is operated magnetically.

As shown in Fig. 13, the brake 43 is operated to check the speed of the rotor 13 as the end of the return motion is approached. Brake 43 is connected by suitable linkage 44 to a solenoid 45, the latter being controlled by a switch 46. Switch 46 is operated by a lever 47. Assuming the rotor is being returned to its starting position by means of the spring 39 in energy storage device 23, the abutment 18 on the arbor 12a hits the switch operating lever 47, thereby turning it in clockwise direction and the closing switch 46. As the solenoid 45 is pulled down, the linkage 44 forces the brake 43 against the brake shoe 43a which is attached to the arbor, thus checking the speed. After the abutment has passed over the switch operating lever 47, the latter swings back to its original position, thus deenergizing the circuit and releasing the brake. The brake does not completely stop the arbor but merely slows it down sufficiently so that there will be no rebound when the abutment 18 hits stationary abutment 19 in returning to starting position. It can be seen that, as the arbor starts on its packing stroke, the abument 18 tilts the switch operating lever in the opposite direction and is not effective to close the switch 46 to operate the solenoid 45. The abutment 18 is made adjustable so that the starting position may be varied. The circuit preferably includes an additional switch 49 which may be manually actuated to render the brake ineffective.

Referring to Figs. 6 and 7, the rotor 12 normally occupies the starting position shown in Fig. 6 where the entrance opening 17 is disposed immediately above the anvil opening for the insertion of blading elements, the rotor having the requisite number of blading elements 48 mounted therein manually at the end of the slot to provide an abutment against which blade elements are packed. As soon as a blading element is inserted in the entrance notch, the clutch is connected; and, as the motor is operating at full speed and under full torque, the arbor and the rotor are rapidly accelerated in the forward direction resulting in sufficient kinetic energy being stored therein for packing purposes as the end of the forward motion is reached, the length of the forward travel decreasing, of course, as more and more blading elements are packed into place. The operation of packing due to impact may be seen from Fig. 7.

While, in Figs. 1, 2, 6, and 7, there is shown a turbine disk which is given forward and return motion, it will be obvious that the turbine element may be stationary and the anvil moved. Accordingly, in Figs. 3 and 4, there is shown a stationary turbine element 50 having undercut grooves 51 for the reception of blading elements, at 52, comprised by blades 53 and packing pieces 54, as heretofore described. An arbor 55 is carried by the bearings 56 of the turbine element 50 and it has an anvil 57 adjustable to extend into the undercut grooves 51 to a desired extent, the anvil being adjustable both radially and axially of the arbor 55. Radial adjustment is effected by means of the connection, at 58, and axial and circumferential adjustments are secured by means of the strap connection 59.

As with the first embodiment, a continuously operating, uni-directional motor 14a is employed, the motor being connected to the arbor by means of a clutch 16a to effect forward motion of the anvil 57 and the clutch being disconnected to effect return motion of the anvil, connection and disconnection being effected by means of the operating cylinder 18a and return motion being brought about by the energy storage device at 17a.

In the embodiment shown in Figs. 3 and 4, when a groove is to be cleared, the end of the groove opposite to the entrance end first has blading elements manually packed therein sufficiently to afford adequate backing for the ensuing mechanical operations of blading element packing. The anvil 57 is properly adjusted to fit the groove and it is adjusted circumferentially of the arbor 55 so as to clear the entrance end of the groove 51 to provide for insertion of blading elements. After a blading element is inserted in the groove, the clutch 16a is connected, whereupon the full motor speed and torque are effective to rapidly accelerate the arbor and the anvil to move the blading element along the groove and then to pack the latter by impact adjacent to a previously assembled blading element. When the anvil has reached the packing position, the operator releases the clutch whereupon the energy storage device 17a becomes effective to move the arbor and the anvil in return direction to starting position.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. In a machine for blading a turbine element having an undercut groove provided with an entrance for the reception of blading elements, an anvil element arranged to extend into the groove, means constraining said turbine and anvil elements to occupy normally a predetermined relative starting position at which blading elements are inserted into the groove entrance, an energy storage device, means for effecting relative movement of the turbine and anvil elements in a forward direction for storing energy in said energy storage device and for pushing a blading element along the groove and packing it in place in abutment with the immediately preceding assembled blading element, and means for releasing said driving means when said turbine and anvil elements approximately reach the relative position where a blading element is packed against the preceding one and for rendering said energy storage device effective to produce relative movement of the turbine and anvil elements in a return direction to starting position.

2. In a machine for blading a turbine element having an undercut groove provided with an entrance for the reception of blading elements and having a sufficient number of blades assembled in the groove remote from the entrance to form a backing for other blading elements, an anvil element arranged to extend into the groove, means constraining said turbine and anvil elements to occupy normally a predetermined relative starting position with the groove entrance adjacent to the anvil element and between the latter and the previously assembled blading elements, an energy storage device, means for effecting relative movement of the turbine and anvil elements in a forward direction for storing energy in said energy storage device and for pushing a blading element along the groove and packing it in place in abutment with the immediately preceding assembled blading element, and means for releasing said driving means when said turbine and anvil elements approximately reach the relative position where a blading element is packed against the preceding one and for rendering said energy storage device effective to produce relative movement of the turbine and anvil elements in a return direction to starting position.

3. In a machine for blading a turbine element having an undercut groove provided with an entrance for the reception of blading elements and the groove having a sufficient number of blades assembled therein remote from the entrance end to form a backing for other blading elements, an anvil element arranged to extend into the groove, means for feeding the anvil element into and retracting it from the groove, means constraining said turbine and anvil elements to occupy normally a predetermined relative starting position with the groove entrance adjacent to the anvil element and between the latter and the previously assembled blading elements, means for effecting relative movement of the turbine and anvil elements in a forward direction for storing energy in said energy storage device and for pushing a blading element along the groove and packing it in place in abutment with the immediately preceding assembled blading element, and means for releasing said driving means when said turbine and anvil elements approximately reach the relative position where a blading element is packed against the preceding one and for rendering said energy storage device effective to produce relative movement of the turbine and anvil elements in a return direction to starting position.

4. In a machine for blading a turbine element having an undercut groove provided with an entrance for the reception of blading elements and having a sufficient number of blades assembled in the groove remote from the entrance to form a backing for other blading elements, an anvil element arranged to extend into the groove, means constraining said turbine and anvil elements to occupy normally a predetermined relative starting position at which blading elements are inserted into the groove entrance, an energy storage device, means for effecting relative movement of the turbine and anvil elements in a forward direction for storing energy in said energy storage device and for positioning a blading element along the groove and packing it in place in abutment with the immediately preceding assembled blading element, means for releasing said driving means when said turbine and anvil elements approximately reach the relative position where a blading element is packed against the preceding one and for rendering said energy storage device effective to produce relative movement of the turbine and anvil elements in a return direction to starting position, and means for effecting a braking action to retard relative return movement of the elements as starting position is approached.

5. In a machine for blading a turbine element having an undercut groove provided with an entrance for the reception of blading elements and having a sufficient number of blades assembled in the groove remote from the entrance to form a backing for other blading elements, an anvil element arranged to extend into the groove, said turbine and anvil elements normally occupying relatively a starting position at which blading elements are inserted into the groove entrance, an energy storage device, means for effecting relative movement of the turbine and anvil elements in a forward direction for storing energy in said energy storage device and for positioning a blading element along the groove and packing it in place in abutment with the immediately preceding assembled blading element, means for releasing said driving means when said turbine and anvil elements approximately reach the relative position where a blading element is packed against the preceding one and for rendering said energy storage device effective to produce relative movement of the turbine and anvil elements in a return direction to starting position, and means responsive to relative return movement of the turbine and anvil elements for retarding such movement as starting position is approached.

6. In a machine for blading a turbine rotor element having an undercut groove for the reception of blading elements, a supporting frame structure having bearings, an arbor carried by the bearings for supporting a rotor element, an anvil arranged to extend into the groove of the rotor element, relatively adjustable stops on the arbor and frame structure constraining said turbine and anvil elements to occupy normally a starting position with the rotor element disposed so that the entrance to the groove occupies a predetermined position for the insertion of blading elements, mechanism for imparting forward and return rotary motion to the arbor, said mechanism including a clutch for rotating the arbor in a forward direction with the anvil holding a blading element for relative movement along the groove, the energy of the arbor and of the rotor being utilized upon impact of a previously assembled blading element with the blading element held by the anvil to cause deformation of the latter blading element in order to pack it in place adjacent to the previously packed blade element, and said mechanism including means for releasing said clutch for effecting rotation of the arbor in a return direction to starting position.

7. In a machine for blading a turbine rotor element having an undercut groove for the reception of blading elements, an arbor for carrying a rotor element, an anvil arranged to extend into the groove of the rotor element, means constraining said arbor and the anvil to occupy normally a starting position with the rotor element disposed so that the entrance to the groove occupies a predetermined position for the insertion of blading elements, a motor, a clutch between the motor and the arbor and effective for causing the motor to turn the arbor in a forward direction so that the anvil may hold a blading element for movement along the groove and so that energy of the arbor and of the rotor may be utilized when impact of a previously assembled blade element occurs with the blading element held by the anvil to cause deformation of the latter blading element in order to pack it in place adjacent to the previously packed blading element, control mechanism for the clutch effective normally to hold the clutch disconnected and including means operative to effect connection thereof so that the motor may drive the arbor, and means effective to turn the arbor in a return direction when the clutch is released.

8. In a machine for blading a turbine rotor element having an undercut groove for the reception of blading elements, an arbor for carrying a rotor element, an anvil arranged to extend into the groove, means for feeding the anvil into and retracting it from the groove, adjustable means providing for the rotor element and the anvil occupying a starting position with the groove entrance at a predetermined location for the insertion of blading elements, a driving motor, means including a clutch which when engaged results in the motor turning the arbor in a forward direction so that the anvil may hold a blading element for movement along the groove until it contacts with a previously assembled blading element whereupon energy of the rotor and arbor is effective to cause packing of the blading element in the groove, and control mechanism for the clutch effective normally to hold the latter released and including means operative to effect its connection to cause the motor to drive the arbor and the rotor element in a forward direction and means effective when the clutch is released after forward turning of the arbor and the rotor element for returning the latter to starting position.

9. In a machine for blading a turbine rotor element having an undercut groove for the reception of blading elements, an arbor for carrying a rotor element, an anvil arranged to extend into the groove, means for feeding the anvil into and retracting it from the groove, means providing for the rotor element and the anvil occupying a starting position with the groove entrance at a predetermined location for the insertion of blading elements, a driving motor, means including a clutch for causing the motor to turn the arbor in a forward direction so that the anvil may hold a blading element for movement along the groove until it contacts with a previously assembled blading element whereupon energy of the rotor and arbor is effective to cause packing of the blading element in the groove, control mechanism for the clutch and effective normally to hold the latter released and including means operative to effect its connection to cause the motor to drive the arbor and the rotor element in a forward direction, means effective when the clutch is released after forward turning of the arbor and the rotor for returning the latter to starting position, and means for retarding the return motion of the arbor and the rotor as starting position is approached.

10. In a machine for blading a turbine rotor element having an undercut groove for the reception of blading elements, an arbor for carrying a rotor element, an anvil arranged to extend into the groove, means for feeding the anvil into and retracting it from the groove, adjustable means providing for the rotor element and the anvil occupying a starting position with the groove entrance at a predetermined location for the insertion of blading elements, a unidirectional rotary driving element, a clutch between said element and the arbor for causing the driving element to turn the arbor in a forward direction so that the anvil may hold a blading element for movement along the groove until it contacts with a previously assembled blading element whereupon energy of the rotor and arbor is effective to cause packing of the blading element in the groove, means for engaging and disengaging the clutch and effective normally to hold the latter released, said clutch when engaged causing the driving element to drive the arbor and the rotor element in a forward direction, and means providing for the storage of energy derived from the driving element during forward motion of the arbor and effective, when the clutch is released, to return the arbor and the rotor element to starting position.

11. In a machine for blading a turbine rotor element having an undercut groove for the reception of blading elements, an arbor for carrying a rotor element, an anvil arranged to extend into the groove, means for feeding the anvil into and retracting it from the groove, adjustable means providing for the rotor element and the anvil occupying a starting position with the groove entrance at a predetermined location for the insertion of blading elements, a driving motor, means including a frictional clutch for causing the motor to turn the arbor in a forward direction so that the anvil may hold a blading element for movement along the groove until it contacts with a previously assembled blading element whereupon energy of the rotor and arbor is effective to cause packing of the blading element in the groove, control mechanism for the clutch and effective normally to hold the latter released and including means operative to effect its connection to cause the motor to drive the arbor and the rotor element in a forward direction, and means including a spring whose load is increased by the forward motion of the arbor and the rotor element and effective, when the clutch is released, to return the arbor and the rotor element to starting position.

12. In a machine for blading a turbine rotor element having an undercut groove for the reception of blading elements, an arbor for carrying a rotor element, an anvil arranged to extend into the groove, means for feeding the anvil into and retracting it from the groove, means providing for the rotor element and the anvil occupying a starting position with the groove entrance at a predetermined location for the insertion of blading elements, a driving motor, means including a clutch for causing the motor to turn the arbor in a forward direction so that the anvil may hold a blading element for movement along the groove until it contacts with a previously assembled blading element whereupon energy of the rotor and arbor is effective to cause packing of the blading element in the groove, control mechanism for the clutch and effective normally to hold the latter released and including means operative to effect its connection to cause the motor to drive the arbor and the rotor element in a forward direction, means effective when the clutch is released after forward turning of the arbor and of the rotor element for returning the latter to starting position, and means for retarding return motion of the arbor and the rotor as starting position is approached.

13. In a machine for blading a turbine element having an undercut groove provided with an entrance for the reception of blading elements, a supporting frame structure having bearings, an arbor carried by the bearings for supporting a turbine element, an anvil arranged to extend into the groove, means providing for the turbine and anvil elements occupying a starting position with the groove entrance at a predetermined location for the insertion of the blading elements, said means comprising cooperating stop members, one of said stop members being fixedly carried by the supporting frame and the other being carried by the arbor and being adjustable circumferentially thereof, an energy storage device, means for effecting relative movement of the turbine and anvil elements in a forward direction for storing energy in said energy storage device and for pushing a blading element along the groove and packing it in place in abutment with the immediately preceding assembled blading element, and means for releasing said driving means when said turbine and anvil elements reach approximately the relative position where a blading element is packed against the preceding one and for rendering said energy storage device effective to produce relative movement of the turbine and anvil elements in a return direction to starting position.

14. In a machine for blading a turbine element having an undercut groove provided with an entrance for the reception of blading elements, stationary structure, an arbor carried by said structure for supporting a turbine element, an anvil carried by said structure arranged to extend into the groove, an energy storage device, means for effecting relative movement of the turbine and anvil elements in a forward direction for storing energy in said energy storage device and for pushing a blade element along the groove and packing it in place in abutment with the immediately preceding assembled blading element, means for releasing said driving means when said turbine and anvil elements reach approximately the relative position where a blading element is packed against the preceding one and for rendering said energy storage device effective to produce relative movement of the turbine and anvil elements in a return direction to starting position, braking means for retarding relative return movement of the elements as starting position is approached, means including parts carried by the arbor and by the stationary structure to provide for the turbine and anvil elements occupying a starting position with the groove entrance at a predetermined location for the insertion of the blading elements, and means including said arbor-carried part of the last-named means for rendering the braking means effective before starting position is reached.

15. In a machine for blading a turbine element having an undercut groove provided with an entrance for the reception of blading elements, an arbor for supporting a turbine element, an anvil arranged to extend into the groove, an energy storage device, means for effecting relative movement of the turbine and anvil elements in a forward direction for storing energy in said energy storage device and for pushing a blading element along the groove and packing it in place in abutment with the immediately preceding assembled blading element, means for releasing said driving means when said turbine and anvil elements reach approximately the relative position where a blading element is packed against the preceding one and for rendering said energy storage device effective to produce relative movement of the turbine and anvil elements in a return direction to starting position, braking means for retarding relative return movement of the elements as starting position is approached, stop means providing for the turbine and anvil elements occupying a starting position with the groove entrance at a predetermined location for the insertion of the blading elements and comprising cooperating stop members, one of said stop members being carried by the arbor and being adjustable circumferentially thereof, and means for rendering the braking means effective before starting position is reached for all positions of adjustment of the adjustable stop member and including said adjustable stop member.

ARTHUR R. ALLARD.